US005217658A

United States Patent [19]

[11] Patent Number: 5,217,658

[45] Date of Patent: Jun. 8, 1993

Schmidt et al.

[54] METHOD FOR REPAIRING A HOT-BLAST LONG-TIME CUPOLA FURNACE

[75] Inventors: Hans Schmidt, Singen, Austria; Max Lehner, Allensbach; Helmut Grey, Krefeld, both of Fed. Rep. of Germany

[73] Assignee: Georg Fischer AG, Schaffhausen, Switzerland

[21] Appl. No.: 740,056

[22] Filed: Aug. 5, 1991

[30] Foreign Application Priority Data

Aug. 3, 1990 [CH] Switzerland ........................ 02543/90

[51] Int. Cl.[5] ........................ B05D 7/22; B28B 11/22; B32B 35/00; C21B 7/06

[52] U.S. Cl. ........................................ 264/30; 264/28; 264/35; 264/36; 264/39; 264/85; 264/570; 264/139; 264/163; 264/265; 264/269; 264/348; 266/44; 266/281; 427/140; 427/230; 427/427

[58] Field of Search ........................ 264/30, 32, 35, 36, 264/28, 39, 82, 83, 85, 348, 265, 269, 570, 139, 163, 161, 162; 427/140, 427, 230, 423; 266/281, 44

[56] References Cited

U.S. PATENT DOCUMENTS 936,981 10/1909 Brätigam .............................. 264/39
3,860,222 1/1975 Tennenhouse ....................... 266/250
4,141,723 2/1979 Denier et al. ......................... 75/557
4,551,287 11/1985 Bethmann ............................ 264/3.1
4,696,421 9/1987 Dürr ................................ 264/28 X
4,793,595 12/1988 Head et al. ........................ 264/30 X
4,871,211 10/1989 Aussel ............................ 266/281 X
4,956,042 9/1990 Hubert et al. .................... 264/28 X

FOREIGN PATENT DOCUMENTS 0194629 9/1980 European Pat. Off. .............. 264/39
49-6722 2/1974 Japan .................................. 266/281
60-19401 6/1976 Japan .................................. 266/281
2040309 2/1987 Japan .................................... 264/30

*Primary Examiner*—Karen Aftergut
*Attorney, Agent, or Firm*—Bachman & LaPointe

[57] ABSTRACT

A method for repairing a hot-blast, long-time cupola furnace by removing residual slag and relining the cupola furnace including feeding liquid nitrogen to the cupola furnace immediately at the end of a smelting operation and simultaneously with the feeding of the liquid nitrogen, removing residual slag from the furnace. The furnace is cooled with liquid nitrogen until the furnace reaches a temperature of less than or equal to 40° C. after which the furnace is relined with fresh refractory tamping compound.

1 Claim, 1 Drawing Sheet

METHOD FOR REPAIRING A HOT-BLAST LONG-TIME CUPOLA FURNACE

BACKGROUND OF THE INVENTION

The present invention relates to a method for repairing a hot-blast, long-time cupola furnace at the end of the smelting operation in the furnace by removing residual slag and relining the cupola.

It is known in the prior art to repair hot-blast, long-time cupola furnaces at the end of a smelting operation by removing residual slag and relining the furnace with fresh refractory tamping compound. In order to accomplish the foregoing, it is necessary that the furnace be cooled at the end of the smelting operation. Heretofore, hot-blast long-time cupola furnaces have been cooled by feeding water to the cupola furnace and its siphon at the end of the smelting operation. In the case of a typical size cupola furnace, the furnace must be cooled with water for at least 8 hours before the interior space of the furnace reaches a temperature sufficiently low for one to enter and remove the residual slag from the furnace. Despite the long cooling period, the residual tamping compound of the refractory lining of the cupola furnace and its siphon is at a temperature which is too high for effecting an efficient binding between the residual tamping compound and fresh refractory tamping compound used to reline the cupola furnace. As a result, in order to allow for sufficient cooling, the cupola furnace is generally out of operation for two consecutive days while being repaired. As a result of the foregoing, the efficiency of the cupola furnace is greatly reduced.

Naturally, it would be highly desirable to provide a method for repairing a cupola furnace by removing residual slag in relining the cupola furnace which does not require an excessive amount of time to be carried out.

Accordingly, it is the principal object of the present invention to provide a method for repairing a hot-blast long-time cupola furnace which is efficient and less time consuming than methods heretofore known.

SUMMARY OF THE INVENTION

The foregoing object is achieved by way of the present invention wherein a method for repairing a hot-blast, long-time cupola furnace at the end of a smelting operation in the furnace by removing residual slag and relining the cupola comprises feeding liquid nitrogen to the cupola furnace immediately at the end of the smelting operation and simultaneously with the feeding of the liquid nitrogen, removing residual slag from the furnace. In accordance with the preferred embodiment of the present invention a remote controlled excavator device may be employed for removing the residual slag from the cupola furnace during the feeding of the liquid nitrogen to the cupola furnace. Once the furnace is cooled to a temperature of about less than or equal to 40° C. the furnace can then be relined with fresh refractory tamping compound and a good bond between the fresh refractory tamping compound and the residual tamping compound is assured.

The method of the present invention allows typical sized cupola furnaces to be cooled to the necessary temperature in less than 4 hours and immediately thereafter the fresh refractory tamping compound can be applied to the interior of the cupola furnace for relining same. Accordingly, excessive down time for the cupola furnace is avoided.

BRIEF DESCRIPTION OF THE DRAWINGS

The invention is described in greater detail with reference to the FIGURE.

DETAILED DESCRIPTION

Figure 1:
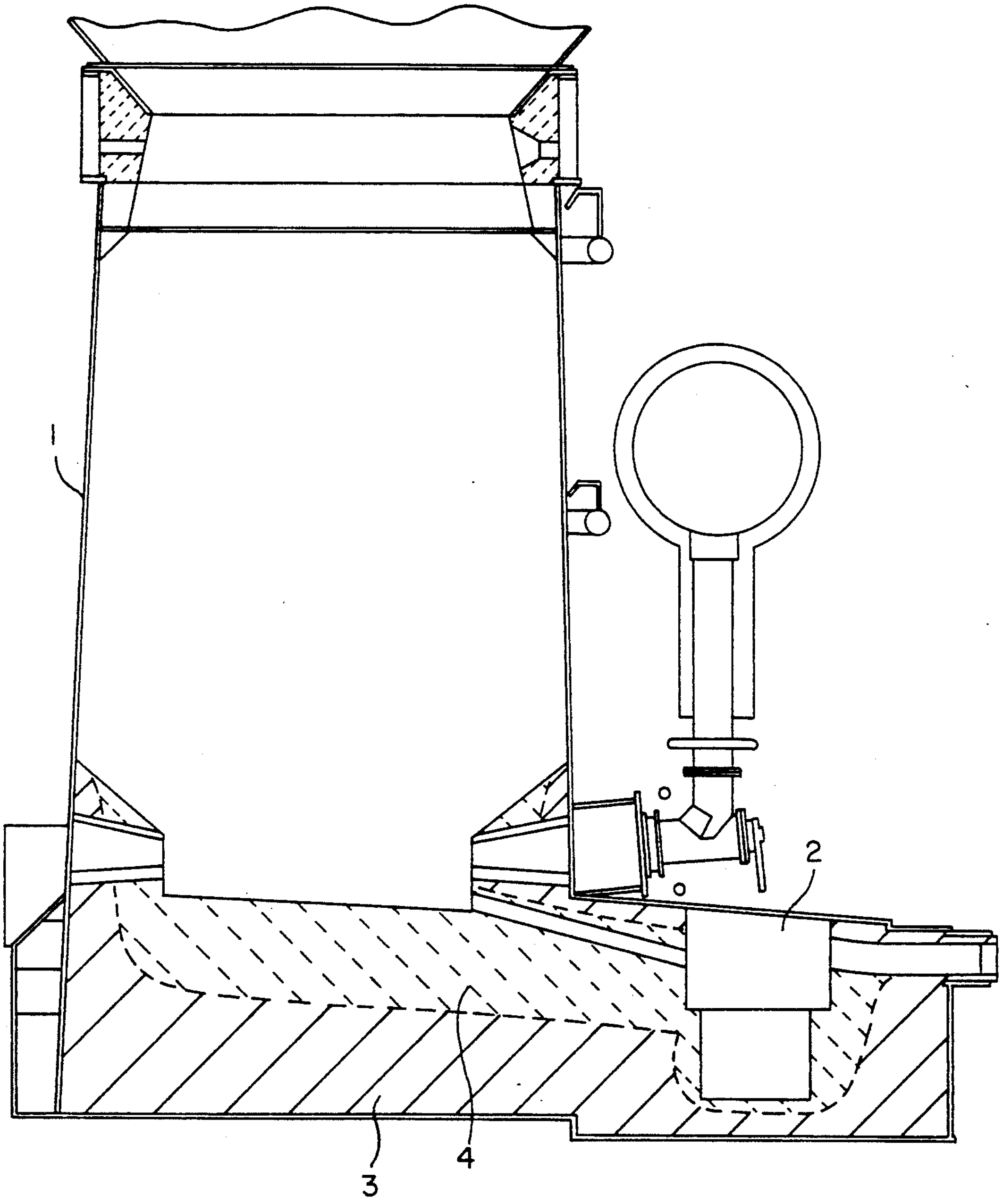
FIG. 1 is a schematic sectional view of a cupola furnace with its siphon which can be repaired in accordance with the method of the present invention.

With reference to FIG. 1, a typical cupola furnace 1 is illustrated in sectional view and comprises a siphon 2 and an interior lining of refractory tamping compound wherein the residual tamping compound area is identified by reference numeral 3 and the burnt out lining area which must be relined with fresh refractory tamping compound is represented by reference numeral 4.

In accordance with the method of the present invention, at the end of a smelting operation, the cupola furnace is supplied with liquid nitrogen to its siphon and interior surface area. Simultaneously with the feeding of liquid nitrogen to the siphon and cupola furnace, residual slag from the furnace is removed by suitable well known excavator devices. In accordance with the preferred embodiment of the present invention, the excavator device for clearing and removing the residual slag may be remotely controlled in a suitable manner known in the art. For typical cupola furnaces of approximately 2700 cm in diameter, the interior of the cupola furnace is cooled to the desired temperature of less than or equal to 40° C. in approximately 4 hours time. After cooling the interior of the surface to a temperature of less than or equal to 40° C., the feeding of the liquid nitrogen is terminated and it is possible to enter the cupola furnace for relining the furnace interior with fresh refractory tamping compound. As the temperature of the interior of the cupola furnace and the residual tamping compound is at a sufficiently low temperature, a superior bond between the fresh refractory tamping compound and the residual tamping compound can be obtained. As a result of the cooling of the cupola furnace and its siphon with liquid nitrogen, the entire repair operation can be completed in approximately 12 hours. Thus, the down time of the cupola furnace is substantially reduced over those repair methods heretofore used which results in substantial reduction in labor costs, the elimination of hard physical work for evacuating the residual slag from the furnace, and the superior relining of the furnace interior which takes place at the desired low temperature.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

That which is claimed is:

1. A method for repairing a hot-blast, long-time cupola furnace at an end of a smelting operation in the cupola furnace by removing residual slag out of the cupola furnace and relining the cupola furnace comprising:

(a) feeding liquid nitrogen to the cupola furnace at the end of the smelting operation so as to cool the cupola furnace to a temperature less than or equal to 40° C. and simultaneously with the feeding of the liquid nitrogen excavating and removing residual slag out of the cupola furnace; and (b) thereafter relining the cupola furnace with fresh refractory tamping compound.

* * * * *